Feb. 22, 1938.                P. GRIEVE                2,109,044
LEVELING INSTRUMENT
Filed Aug. 10, 1936

Inventor
Price Grieve
by Orwig & Hague Attys.

Patented Feb. 22, 1938

2,109,044

UNITED STATES PATENT OFFICE 2,109,044

LEVELING INSTRUMENT

Price Grieve, Sigourney, Iowa

Application August 10, 1936, Serial No. 95,204

4 Claims. (Cl. 33—73)

In the art of forming terraces for the prevention of soil erosion and retention of rainfall, and in the art of forming irrigation ditches and levees, it is at the present time the general practice to employ a tractor to which is hitched a grader or other soil moving machine, and then in order to determine the path along which the soil moving implement is to be advanced, the area is surveyed in the manner usually employed in the surveyor's profession and stakes driven to guide the operator of the soil moving implement. This surveying operation is in many instances prohibitively expensive. Many farmers are equipped with tractors and scrapers, their farms would be greatly improved by such soil conservation operations, and the farmers could easily do the work without expense other than their own time, but cannot do this desirable work because of the heavy expense of surveying.

The object of my invention is to provide a leveling instrument of simple, durable and inexpensive construction designed to be mounted upon a tractor in front of the operator's seat, and whereby the operator may, by viewing the instrument, accurately determine the degree of inclination from the horizontal of the surface upon which the tractor is resting, and at the same time determine the degree of inclination from the horizontal, between the surface upon which the tractor is resting, and a distant point in advance of the tractor, and whereby an operator may accurately construct terraces, ditches, levees and the like, or practice contour farming, at proper levels without the necessity of a preliminary surveying and staking operation.

My invention consists in the construction, arrangement and combination of the various parts of the device, whereby the objects contemplated are attained, as hereinafter more fully set forth, pointed out in my claims, and illustrated in the accompanying drawing, in which:

Figure 1:
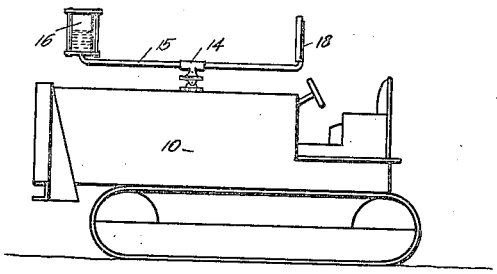
Figure 1 shows a side elevation of a tractor having my improved leveling instrument applied thereto.

Referring to the accompanying drawing, I have used the reference numeral 10 to indicate generally a tractor or other vehicle to which my improved leveling instrument is applied.

The base of the instrument is indicated by the numeral 11 and is shaped to be fitted to and fixed in position on the hood of a tractor between the driver's seat and the front of the tractor. Pivotally connected with the base 11 is a member 12 which is connected for horizontal rotary movement with a corresponding member 13, and at the top of the member 13 is a body 14. This body extends fore and aft of the tractor for a considerable distance so that its ends are widely spaced apart, and the body is provided with a fluid passageway 15 extended through it. By this means I have provided for supporting the instrument and for permitting it to be moved universally. The connections of this part of the instrument are such that it will normally remain in any position in which it is adjusted, and can be moved only by an appreciable pressure by the operator.

At the front of the body 14 is a glass cylinder 16, supported in a suitable frame 17, and being in communication with the passageway 15. I have used the term herein, in describing this cylinder, as a "sight tube", implying that it is made of such material that the operator can look through it and see the level of the liquid therein contained.

At the rear of the body 14 there is a second sight tube 18 of much smaller diameter than the front sight tube, and this also is in communication with the passageway 15. These sight tubes are suitably vented in the ordinary manner to prevent air compression. The sight tubes and passageway are filled with a liquid, preferably bright in color, for convenience in observation through the glass. I preferably supply enough liquid so that the liquid level is approximately at the vertical center of the sight tubes. I preferably provide a hand operated valve 18a at the lower end of the sight tube 18 for preventing the flow of liquid, when desired.

Figure 3:
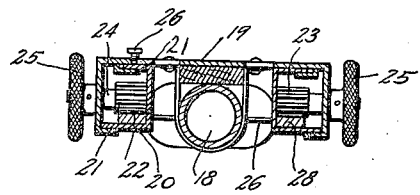
Figure 3 shows a horizontal sectional view on the line 3—3 of Figure 2.

Fixed in position relative to the rear sight tube is a frame indicated generally by the reference numeral 19. On the left side of this frame, as viewed from the rear, I provide a scale 20, which scale is vertically movable relative to the frame and is held in this position by flanges 21. The scale is provided with a rack 22, which rack is in mesh with a pinion 23 connected to a shaft 24, and on this shaft is fixed a knurled disc 25 which, when operated, will move the scale up and down as may be desired. This scale is preferably frictionally held sufficiently to hold it in any adjusted position, but if desired a set screw, 26, may be provided to lock it in any adjusted position. This scale is located in position spaced apart on the adjacent side of the tube 16, as clearly shown in Figure 3, and I preferably provide on the scale at the zero point an indicating finger 27 extended partially across the said opening toward the rear sight tube 18. This opening I have herein formed has a sight opening and is provided so that the operator may have in his line of vision from the driver's seat the liquid level of both sight tubes and the indicating finger of said scale.

On the opposite side of the sight tube 18 is a similar scale, indicated generally by the reference numeral 28, and this scale is provided with a similar means for adjustment and the same indicating finger and the same sight opening as the scale previously described. It is movable, however, and entirely independent from the scale at the left.

It is not essential that the relative diameters of the two sight tubes be that herein shown and described, nor is it essential that the sight tubes extend exactly vertical.

In practical operation, and assuming that it is desired to dig a drainage ditch in a hillside of irregular outline, and that it is desired to form said ditch at an inclination of one per cent from the horizontal, I then proceed as follows: The tractor is moved to position where the surface upon which it rests is exactly horizontal, which may readily be determined by viewing the scale at the left of the rear sight tube and comparing it with the liquid level thereof. When this has been done I preferably adjust the left scale to position with its indicating finger pointing across the sight opening and one degree above the liquid level, so that the operator may accurately and easily determine the inclination of the tractor, the tractor and its ditching implement are then advanced and the operator simply steers the tractor more or less up or down the hillside as may be necessary to maintain the liquid level at the indicating finger. When the implement approaches an unusual irregularity in the surface of the hillside, for instance a depression one hundred feet wide, the operator must decide whether to continue up and across and then down the opposite side of the depression at the same degree of inclination, or to advance comparatively straight across the depression and later form a fill and level. For aid in determining this problem the operator stops the tractor in position with the left indicating finger flush with the liquid level of the rear sight tube. He then looks through the sight opening and over the liquid level of the front sight tube to a point on the opposite side of the depression, and swings the implement to the right or left until he sights a point at the desired degree of inclination on the opposite side of the depression. This is usually done by sighting a bush or stone or other prominent object of which the operator makes a mental notation, as being at the point where the tractor should stand when emerging from the depression. When this has been done the operator uses the instrument somewhat as a surveyor uses his surveyor's instrument, and swings it from side to side and up and down, and sights across the two liquid levels to various points along the path across the depression which the tractor must travel to maintain the desired inclination of the ditch, and the operator again makes mental notation of various objects along this proposed path of travel across the depression. In making said mental notations the operator allows for the distance above the surface at which the instrument is supported on the tractor.

Figure 6:
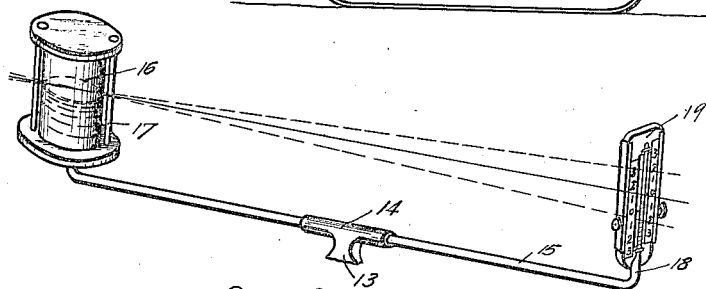
Figure 6 shows a perspective view illustrating my improved leveling instrument.
Figure 4:
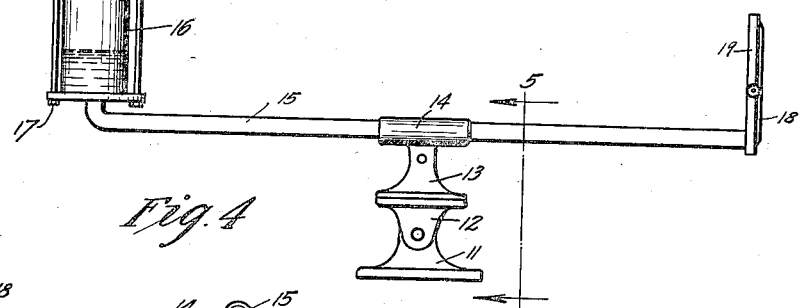
Figure 4 shows a side elevation of my improved leveling instrument detached.
Figure 5:
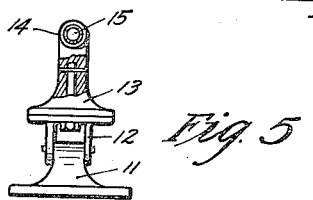
Figure 5 shows a sectional view on the line 5—5 of Figure 4.
Figure 2:
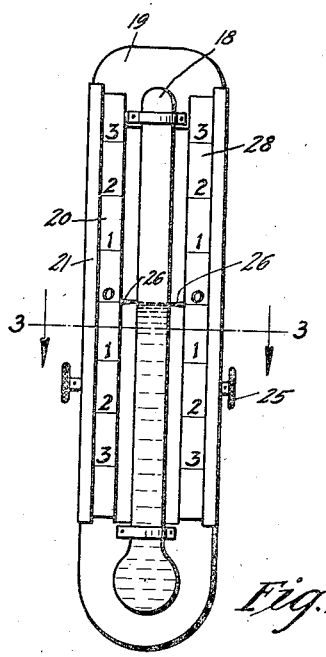
Figure 2 shows a rear elevation illustrating the rear sight tube and associated adjustable scales.

In Figure 6 I have shown two dotted lines and a solid line extended from the scale to and beyond the front sight tube. The solid line indicates the liquid level of both sight tubes. When a distant object has been sighted along the solid line and is found to be below said line, the operator sights across the front sight glass to said distant object and then notes on the scale to the right the degree of such downward inclination. This is illustrated by the upper dotted line. If the selected distant object is above alignment with the said solid line, then a line of sight along the lower dotted line will indicate on the scale the degree of such elevation of the distant object above the true horizontal for the particular operation being performed.

It is true, of course, that said manner of selecting a path for the tractor across the depression is much less accurate than though the same job were being done by an ordinary surveying operation and the placing of guiding stakes. However, in actual practice I have found that an operator of the tractor quickly learns to make this mental survey with sufficient accuracy for practical purposes. The reason why this may be done with my improved apparatus is that, after this preliminary selection of a path across the depression has been made, the operator, while following this path, also carefully watches the liquid level of the rear sight tube as compared with the indicator finger of the left scale, and then he deviates from this selected path by directing the tractor down hill from the selected path if the said liquid level should rise above the indicator finger, or up hill from the selected path if the liquid level should fall below the indicator finger.

I have demonstrated in practice that by the procedure just described a tractor operator may, in a short time, learn to operate the tractor in such manner as to form a drainage ditch in which the desired inclination is maintained with sufficient accuracy for practical purposes.

By using the scale and indicating finger at the left of the rear sight tube for at all times determining the fixed degree of inclination for the entire operation, much time and trouble is saved the operator because this scale needs only the one initial setting for an entire operation. It is, however, frequently necessary to swing the implement to the right or left and up and down to select a path of travel in advance of the tractor, and during such path selection operation it is frequently necessary to swing the implement to the right or left and up and down to select a path of travel in advance of the tractor, and during such path selection operation it is frequently necessary to move the indicator finger and the right scale up and down to determine the degree of inclination from the tractor to a selected object in advance of the tractor. When that has been done the operator simply moves the instrument to position where the left indicating finger and the liquid level of the rear sight tube are in their previously determined relative positions, whereupon the ditching operation is then continued at proper grade by reference to the left scale only.

I can attain fairly satisfactory results by having the two scales stationary and moving the indicating fingers up and down relative to the scales. In the drawing these indicating fingers are shown to be adjustable relative to the rear sight tube.

I claim as my invention:

1. A leveling implement comprising a base whereby the implement may be supported upon a vehicle, a member mounted on said base for pivotal movement relative to the base both horizontally and vertically, a sight tube at the front end of said member and a sight tube at the rear end of said member, a fluid in the sight tubes, and means for providing communication for the liquid from one sight tube to the other, said sight tubes being made of transparent material so that the liquid levels in both tubes may be seen by an operator, two scales one on each side of the rear sight tube and spaced apart from the rear sight tube to provide sight openings through which an operator may see the liquid levels of both tubes and at the same time see both scales, and an adjustable indicator finger for each scale extended across said opening from the scale toward the rear sight tube, in such position that an operator while viewing the liquid levels of both sight tubes and viewing both scales, may also in the same line of vision view both of said indicatng fingers.

2. A leveling implement comprising a base, a member pivotally mounted on the base for both vertical and horizontal movement, a sight tube at each end of said member and in communication with each other, a liquid in the sight tubes and two scale indicating devices associated with the rear sight tube, said parts being made of such material and being so arranged and disposed relative to each other that an operator at the rear of the rear sight tube may, at the same time and in the same line of vision, see the liquid levels of both sight tubes and both of said scale indicating devices, and through said sight tubes to a distant point in line with the liquid levels of the sight tubes.

3. A leveling implement comprising a base, a member pivotally mounted on the base for both vertical and horizontal movement, a sight tube at each end of said member and in communication with each other, a liquid in the sight tubes and two scale indicating devices associated with the rear sight tube, said parts being made of such material and being so arranged and disposed relative to each other that an operator at the rear of the rear sight tube may, at the same time and in the same line of vision, see the liquid levels of both sight tubes and both of said scale indicating devices, and a distant point through the front sight tube in line with the liquid levels of the sight tubes, one of said scale indicating devices being capable of being adjustably fixed in various positions relative to the liquid level of the rear sight tube.

4. A leveling implement comprising a base, a member pivotally mounted on the base for both vertical and horizontal movement, a sight tube at each end of said member and in communication with each other, a liquid in the sight tube and two scale indicating devices associated with the rear sight tube, said parts being made of such material and being so arranged and disposed relative to each other that an operator at the rear of the rear sight tube may, at the same time and in the same line of vision, see the liquid levels of both sight tubes and both of said scale indicating devices, and through said sight tubes to a distant point in line with the liquid levels of the sight tubes, one of said scale indicating devices being capable of being adjustably fixed in various positions relative to the liquid level of the rear sight tube and the other being capable of adjustment relative to the rear sight tube.

PRICE GRIEVE.